(12) United States Patent
Yamamoto

(10) Patent No.: US 8,171,405 B2
(45) Date of Patent: May 1, 2012

(54) INFORMATION PROCESSING PROGRAM, INFORMATION PROCESSING METHOD, AND INFORMATION PROCESSING DEVICE

(75) Inventor: Taro Yamamoto, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 324 days.

(21) Appl. No.: 12/543,770

(22) Filed: Aug. 19, 2009

(65) Prior Publication Data

US 2010/0050073 A1 Feb. 25, 2010

(30) Foreign Application Priority Data

Aug. 20, 2008 (JP) ................................. 2008-212283

(51) Int. Cl.
*G06F 17/00* (2006.01)
(52) U.S. Cl. ........................................ 715/277; 715/255
(58) Field of Classification Search .................. 715/271, 715/272, 273, 277, 255
See application file for complete search history.

(56) References Cited

U.S. PATENT DOCUMENTS 5,003,499 A * 3/1991 Fujiwara et al. .............. 715/246
5,181,162 A * 1/1993 Smith et al. ................... 715/209
5,182,709 A * 1/1993 Makus .............................. 704/9

(Continued)

FOREIGN PATENT DOCUMENTS

JP 04-241977 8/1992

(Continued)

OTHER PUBLICATIONS

"How great 'My picture' option of XP is! How great the supernatural power of dedicated software is! How great the Excel images database is! How great 'storage' and 'organization' of digital camera images are!," Second Issue, Eighth Edition of "ASCII.PC" published in Japan on Feb. 1, 2005 by ASCII Corporation, pp. 34-35.

(Continued)

*Primary Examiner* — Laurie Ries
(74) *Attorney, Agent, or Firm* — Buchanan Ingersoll & Rooney PC

(57) ABSTRACT

The present invention is intended to improve operability in page-by-page editing operation of a document file having multiple pages using a computer. A display processor displays multiple pages of the document file in list form on a display unit, selects an item to be displayed from a plurality of items contained in attribute information allocated to each page, and displays the attribute information relating to the item that has been selected in association with each page. An editing processor receives page selection operation and editing operation, executes editing process on a selected page, and updates the attribute information by rewriting an item associated with the editing process of the attribute information allocated to the selected page. After the editing process by the editing processor, the display processor selects an item to be displayed from the plurality of items of the attribute information based on the substance of the editing process to update a display item list of the attribute information.

18 Claims, 16 Drawing Sheets

U.S. PATENT DOCUMENTS

| | | | | |
|---|---|---|---|---|
| 5,428,747 | A | * | 6/1995 | Kitamoto ............................ 710/1 |
| 5,718,520 | A | * | 2/1998 | MacKay ........................... 400/61 |
| 5,825,944 | A | * | 10/1998 | Wang ............................ 382/309 |
| 5,983,234 | A | * | 11/1999 | Tietjen et al. ........................... 1/1 |
| 6,003,033 | A | * | 12/1999 | Amano et al. ......................... 1/1 |
| 6,092,091 | A | * | 7/2000 | Sumita et al. .................. 715/209 |
| 6,959,414 | B1 | * | 10/2005 | Kakehashi .................... 715/236 |
| 7,188,311 | B2 | * | 3/2007 | Tanaka et al. ................. 715/248 |
| 7,606,823 | B2 | * | 10/2009 | Kusakabe et al. ....................... 1/1 |
| 7,631,257 | B2 | * | 12/2009 | Kogan et al. ................. 715/239 |
| 7,895,539 | B2 | * | 2/2011 | Carney et al. ................. 716/132 |
| 2004/0123241 | A1 | * | 6/2004 | Kaappa et al. ................. 715/513 |
| 2004/0187081 | A1 | * | 9/2004 | Petz ............................... 715/526 |
| 2005/0028089 | A1 | * | 2/2005 | Aoki et al. .................... 715/513 |
| 2006/0123361 | A1 | * | 6/2006 | Sorin et al. .................... 715/854 |
| 2006/0230343 | A1 | * | 10/2006 | Armandpour et al. ......... 715/517 |
| 2009/0132524 | A1 | * | 5/2009 | Stouffer et al. ................... 707/5 |
| 2010/0146393 | A1 | * | 6/2010 | Land et al. .................... 715/723 |

FOREIGN PATENT DOCUMENTS

| | | |
|---|---|---|
| JP | 5-298048 A | 11/1993 |
| JP | 2000-99236 A | 4/2000 |
| JP | 2004-240582 A | 8/2004 |
| JP | 2005-63245 A | 3/2005 |
| JP | 2005-262683 A | 9/2005 |
| JP | 2006-293598 | 10/2006 |

OTHER PUBLICATIONS

Office Action issued in the corresponding Japanese Patent Application No. 2008-212283 dated Apr. 27, 2010, and an English Translation thereof.

* cited by examiner

Fig. 2

ATTRIBUTE INFORMATION 18

| ITEM | VALUE |
|---|---|
| DOCUMENT SIZE | A4 |
| SHEET TYPE | PLAIN PAPER |
| SHEET SIZE | A4 |
| VERTICAL/HORIZONTAL | VERTICAL |
| CHAPTER | FIRST CHAPTER |
| FINISHING | STAPLING |
| VECTOR/RASTER | VECTOR |
| PRINTING TYPE | SINGLE-SIDED |
| COLOR | MULTICOLOR |
| FRONT/BACK | FRONT |
| PAGE NUMBER | 1 |
| ⋮ | ⋮ |

Fig. 5

ATTRIBUTE INFORMATION DISPLAY LIST 24

| RANK | ITEM |
|---|---|
| 1 | DOCUMENT SIZE |
| 2 | VERTICAL/HORIZONTAL |
| 3 | COLOR |
| 4 | PRINTING TYPE |
| ⋮ | ⋮ |

Fig. 6A

ATTRIBUTE INFORMATION 18

| ITEM | VALUE |
|---|---|
| DOCUMENT SIZE | A4 |
| SHEET TYPE | PLAIN PAPER |
| SHEET SIZE | A4 |
| VERTICAL/HORIZONTAL | HORIZONTAL |
| CHAPTER | FIRST CHAPTER |
| FINISHING | STAPLING |
| VECTOR/RASTER | VECTOR |
| PRINTING TYPE | SINGLE-SIDED |
| COLOR | MULTICOLOR |
| FRONT/BACK | FRONT |
| PAGE NUMBER | 2 |
| ⋮ | ⋮ |

Fig. 6B

ATTRIBUTE INFORMATION 18

| ITEM | VALUE |
|---|---|
| DOCUMENT SIZE | A4 |
| SHEET TYPE | PLAIN PAPER |
| SHEET SIZE | A4 |
| VERTICAL/HORIZONTAL | VERTICAL |
| CHAPTER | FIRST CHAPTER |
| FINISHING | STAPLING |
| VECTOR/RASTER | VECTOR |
| PRINTING TYPE | SINGLE-SIDED |
| COLOR | MULTICOLOR |
| FRONT/BACK | FRONT |
| PAGE NUMBER | 2 |
| ⋮ | ⋮ |

Fig. 7

OPERATION-RELATED ITEM INFORMATION  25

| OPERATION | FIRST IMPORTANT ITEM | SECOND IMPORTANT ITEM |
|---|---|---|
| PAGE ROTATION | VERTICAL/HORIZONTAL | SHEET SIZE |
| SHEET TYPE SETTING | SHEET TYPE | DOCUMENT SIZE |
| COLOR SETTING | COLOR | SHEET TYPE |
| SIZE SETTING | DOCUMENT SIZE | SHEET SIZE |
| CHAPTER SETTING | CHAPTER | FRONT/BACK |
| FINISHING SETTING | FINISHING | PRINTING TYPE |
| PRINTING TYPE SETTING | PRINTING TYPE | SHEET SIZE |
| ⋮ | ⋮ | ⋮ |

Fig. 8

ATTRIBUTE INFORMATION DISPLAY LIST 24

| RANK | ITEM |
|---|---|
| 1 | VERTICAL/HORIZONTAL |
| 2 | SHEET SIZE |
| 3 | DOCUMENT SIZE |
| 4 | COLOR |
| ⋮ | ⋮ |

Fig. 11

ATTRIBUTE INFORMATION DISPLAY LIST 24

| RANK | ITEM |
|---|---|
| 1 | VERTICAL/HORIZONTAL |
| 2 | CHAPTER |
| 3 | FRONT/BACK |
| 4 | DOCUMENT SIZE |
| ⋮ | ⋮ |

ND INFORMATION PROCESSING DEVICE

INFORMATION PROCESSING PROGRAM, INFORMATION PROCESSING METHOD, AND INFORMATION PROCESSING DEVICE

This application is based on the application No. 2008-212283 filed in Japan, the contents of which are hereby incorporated by reference.

BACKGROUND OF THE INVENTION

1. Field of the Invention

The present invention relates to an information processing program, an information processing method, and an information processing device. The present invention more specifically relates to an information processing program, an information processing method, and an information processing device for performing page-by-page editing of a document file having multiple pages to each of which attribute information with a plurality of items is allocated.

2. Description of the Background Art

For a document file having multiple pages, it is a publicly known technique to set attribute information separately for each of the pages constituting the document file (as disclosed for example in Japanese Patent Application Laid-Open No. 2005-262683). In this case, the attribute information of each page contains a plurality of items such as a page number.

A computer installed application software such as an image editing application or a page editing application executes page-by-page editing of a document file as discussed above having multiple pages for each of which attribute information with a plurality of items is set by starting software. As an example, when one, or more than one page selected from multiple pages constituting a document file is rotated 90 degrees, the direction in which the selected page is laid is changed from a vertical direction to a horizontal direction or from a horizontal direction to a vertical direction.

In this case, the multiple pages contained in the document file are displayed in list form, and attribute information allocated to each page is displayed in association with a corresponding page on a display screen of the computer. So, a user is allowed to select a page to be edited while seeing attribute information of each page displayed on the display screen. After editing process is executed, it is determined whether or not attribute information properly reflects user's intension by seeing an item of the attribute information corresponding to the executed editing process.

However, many items of attribute information can be set for each page in such a document file. So, it is difficult to display all attribute information of each page on a display screen of a computer. Thus, when an item of attribute information a user wishes to see is not displayed on the displayed screen, he or she should change the displayed items manually. This results in complicated operation for selecting a page to be edited, so a page to be edited cannot smoothly be selected.

After editing process of a selected page is executed, it is determined whether or not an item of attribute information corresponding to the editing process is rewritten. In this case, the user should also change the displayed items manually when the rewritten item is not displayed on the display screen. This results in complicated operation for confirming a result of editing, so a result of editing cannot efficiently be confirmed.

Because all of the pages cannot be displayed simultaneously in list form when many pages are contained in a document file, a user should select a page to be edited from the many pages by scrolling through the list. This results, not only in a long time required to see the attribute information of all pages, but also in a high probability of the omission of a page to be edited from being selected.

SUMMARY OF THE INVENTION

In order to solve the problems in the background art, the present invention is intended to improve the operability in page-by-page editing operation of a document file having multiple pages using a computer.

First, the present invention is intended for an information processing program stored on a computer readable medium for causing a computer to perform page-by-page editing of a document file having multiple pages to each of which attribute information with a plurality of items is allocated.

According to one aspect of this invention, the information processing program causes the computer to execute processing the steps of: (a) displaying the multiple pages of the document file in list form on a display unit, selecting at least one item to be displayed as a display item list from the plurality of items of the attribute information, and displaying the attribute information relating to said at least one item in association with each page; (b) receiving page selection operation and editing operation on a selected page entered through a manipulation input unit, specifying the page to be edited selected from the multiple pages, executing editing process on the specified page based on the editing operation, and updating the attribute information by rewriting an item associated with the editing operation of the attribute information allocated to the specified page; and (c) selecting at least one item to be displayed from the plurality of items of the attribute information based on the substance of the editing operation, and thereby updating the attribute information displayed on the display unit as the display item list in step (a).

Second, the present invention is intended for an information processing method of performing page-by-page editing on a document file having multiple pages to each of which attribute information with a plurality of items is allocated.

According to one aspect of this invention, the information processing method comprises the steps of: (a) displaying the multiple pages of the document file in list form on a display unit, selecting at least one item to be displayed from the plurality of items of the attribute information, and displaying the attribute information relating to said at least one item in association with each page; (b) receiving page selection operation and editing operation on a selected page, specifying the page to be edited selected from the multiple pages, executing editing process on the specified page based on the editing operation, and updating the attribute information by rewriting an item associated with the editing operation of the attribute information allocated to the specified page, and (c) selecting at least one item to be displayed from the attribute information based on the substance of the editing operation, and thereby updating the attribute information displayed on the display unit.

Third, the present invention is intended for an information processing device for performing page-by-page editing on a document file having multiple pages to each of which attribute information with a plurality of items is allocated.

According to one aspect of this invention, the information processing device comprises: a storage unit for storing therein the document file; a display unit for performing display based on the document file; a manipulation input unit for performing page selection operation to select a page to be edited from the multiple pages of the document file, and editing operation on a selected page; a display processor for reading the document file from the storage unit, displaying the multiple pages of the document file in list form on the display unit, selecting an item to be displayed from the plurality of items of the attribute information, and displaying the attribute information relating to the item that has been selected in association with each page; and an editing processor for receiving page selection operation and editing operation entered through the manipulation input unit, specifying a page to be edited selected from the multiple pages, performing editing process on the specified page, and updating the attribute information by rewriting an item associated with the editing process of the attribute information allocated to the specified page. After the editing process by the editing processor, the display processor selects an item to be displayed from the plurality of items of the attribute information based on the substance of the editing process to update the attribute information displayed on the display unit.

According to these information processing programs, the information processing method and the information processing device of the present invention, a page to be edited is efficiently selected from multiple pages. Further, after the execution of editing process, a result of this editing process is easily confirmed.

BRIEF DESCRIPTION OF THE DRAWINGS

FIG. 2 shows an example of attribute information allocated to each page of multiple pages constituting a document file;

FIG. 5 shows an example of attribute information display list at the time of its creation based on default values;

FIGS. 6A and 6B show an example of how attribute information is rewritten as a result of page editing process;

FIG. 7 shows an example of operation-related item information;

FIG. 8 shows an example of the attribute information display list updated as a result of page rotation with one page selected;

FIG. 11 shows an example of the attribute information display list updated as a result of page rotation with two or more pages selected;

DESCRIPTION OF THE PREFERRED EMBODIMENTS

Figure 1:
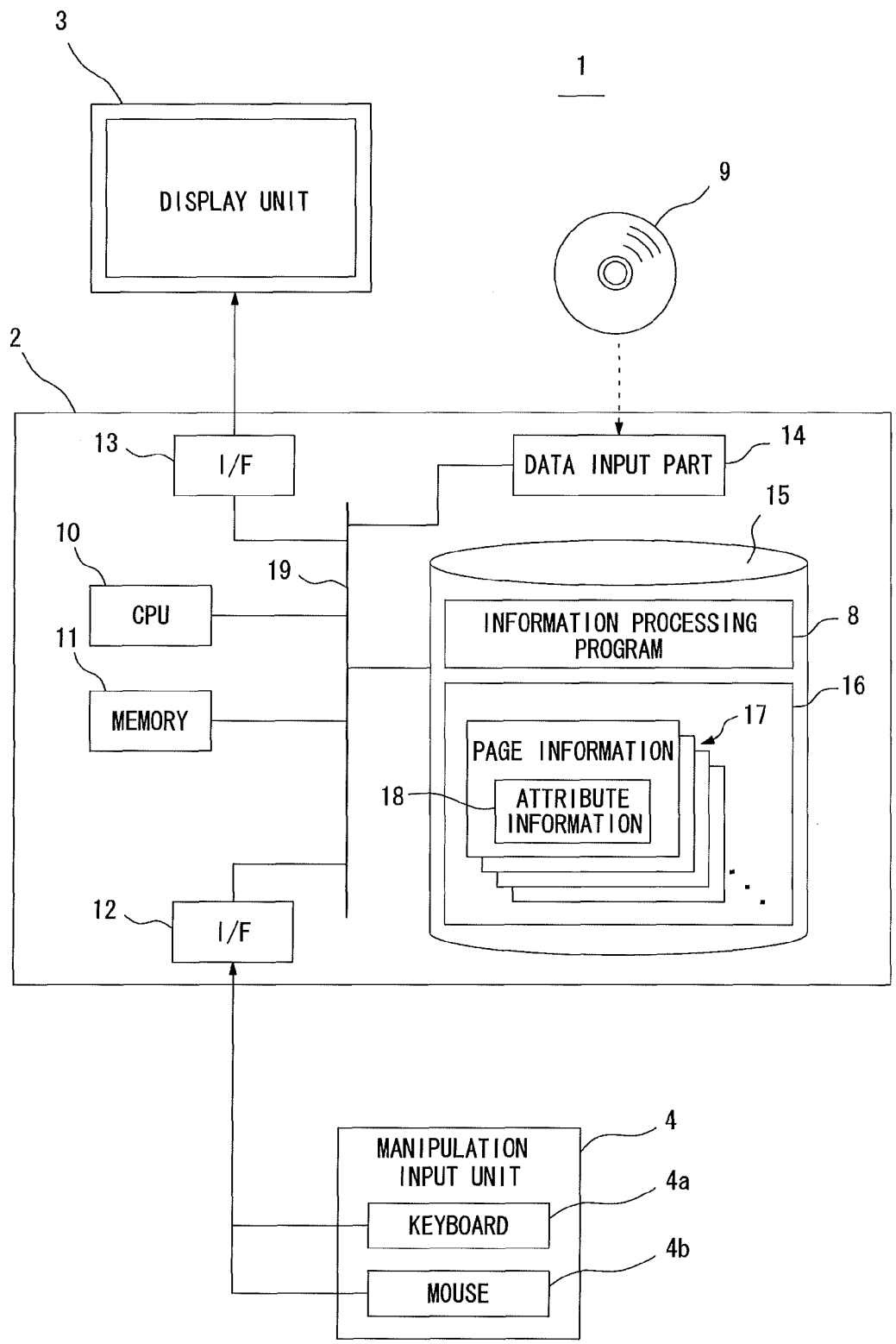
FIG. 1 shows an exemplary configuration of an information processing device according to a preferred embodiment of the present invention.

A preferred embodiment of the present invention is described in detail below with reference to drawings. In the following description, those elements shared in common through the description are represented by the same reference numerals in the drawings, and these elements are not discussed repeatedly for the same description.

FIG. 1 shows an exemplary configuration of an information processing device 1 according to the present preferred embodiment. The information processing device 1 is constituted by a generally used computer such as what is called a personal computer (PC), and comprises a computer main unit 2, a display unit 3 for presenting various types of information to a user, and a manipulation input unit 4 with a keyboard 4a and a mouse 4b operable by a user. The computer main unit 2 includes therein a CPU 10, a memory 11, interfaces 12 and 13, a data input part 14, and a storage unit 15 such as a hard disk device. Data communication between these components is realized by a data bus 19. The CPU 10 performs arithmetic processing based on a program. The memory 11 is constituted by a ROM and a RAM, and stores therein information used for the arithmetic processing by the CPU 10. The interface 12 connects the manipulation input unit 4 to the computer main unit 2. The interface 13 connects the display unit 3 to the computer main unit 2. The data input part 14 receives data from a computer-readable recording medium 9 or from another computer through a network and the like, and stores the received data into the computer main unit 2.

An information processing program 8 is installed in advance in the computer main unit 2, and is stored in the storage unit 15. An operating system (OS) not shown is installed in the computer main unit 2. The operating system is started at turn-on to operate the computer main unit 2. The information processing program 8 is read and executed by the CPU 10 when the operating system is in operation in the computer main unit 2.

The information processing program 8 is executed by the CPU 10 to cause the information processing device 1 to serve as a device for performing page-by-page editing of a document file having multiple pages. The storage unit 15 stores therein a document file 16 to be edited. The document file 16 contains page information 17 defined for each page, and which includes substantial data such as an image or a text in each page. Attribute information 18 relating to each page is allocated to the page information 17 of the corresponding page. As an example, a user operates the information processing device 1 to perform document file creation while the information processing program 8 or another program is running on the computer main unit 2, thereby creating the document file 16. The created document file is stored in the storage unit 15. A document file 16 created by a device different from the information processing device 1 may be input through the data input part 14 and stored in the storage unit 15.

FIG. 2 shows an example of the attribute information 18 allocated to each page. As shown in FIG. 2, the attribute information 18 allocated to each page is given a plurality of items. By way of example, "Document Size" is an item for defining the page size of the substantial page information 17, "Sheet Type" is an item for defining a sheet type for printing, and "Sheet Size" is an item for defining a sheet size for printing. "Vertical/Horizontal" is an item for determining whether a page should be laid in a vertical direction or in a horizontal direction, "Chapter" is an item for determining to which chapter a page belongs, and "Finishing" is an item for determining whether finishing process such as stapling or punching should be implemented after printing. "Vector/Raster" is an item for determining whether the page information 17 is vector format data or raster format data, "Printing Type" is an item for determining whether a page should be printed by single-sided printing or by double-sided printing, and "Color" is an item for defining color setting for printing. "Front/Back" is an item for determining whether a page should be printed on a front side or on a back side in the case of double-sided printing, and "Page Number" is an item for defining the page number of a page. Many other items may be provided. As discussed, the attribute information 18 is given a plurality of items that can be set for each page, and the values of the items may differ among pages. Thus, the document file 16 is constituted by multiple pages with the attribute information 18 that differs among pages.

Figure 3:
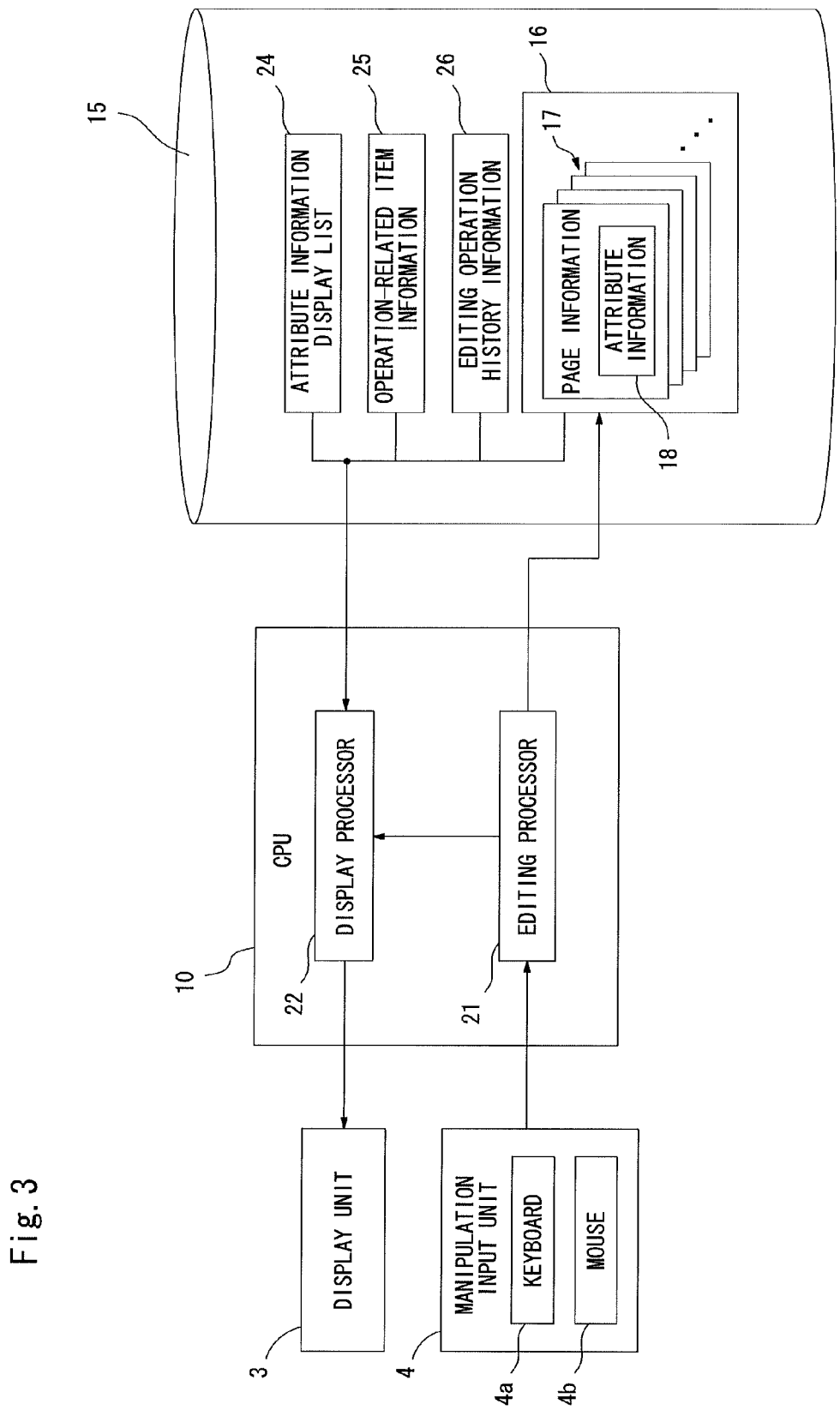
FIG. 3 is a block diagram of the functional configuration of the information processing device while an information processing program is running.

FIG. 3 is a block diagram of the functional configuration of the information processing device 1 while the information processing program 8 is running. The CPU 10 executes the information processing program 8 to function as an editing processor 21 and a display processor 22. The editing processor 21 performs editing process on the page information 17 of a selected page based on the substance of operation a user made through the manipulation input unit 4. Along with this editing process, the editing processor 21 rewrites an item associated with the editing process of the attribute information 18 allocated to the selected page, thereby updating the attribute information 18. The display processor 22 reads the document file 16 stored in the storage unit 15, and causes the display unit 3 to display based on the document file 16.

Figure 4:
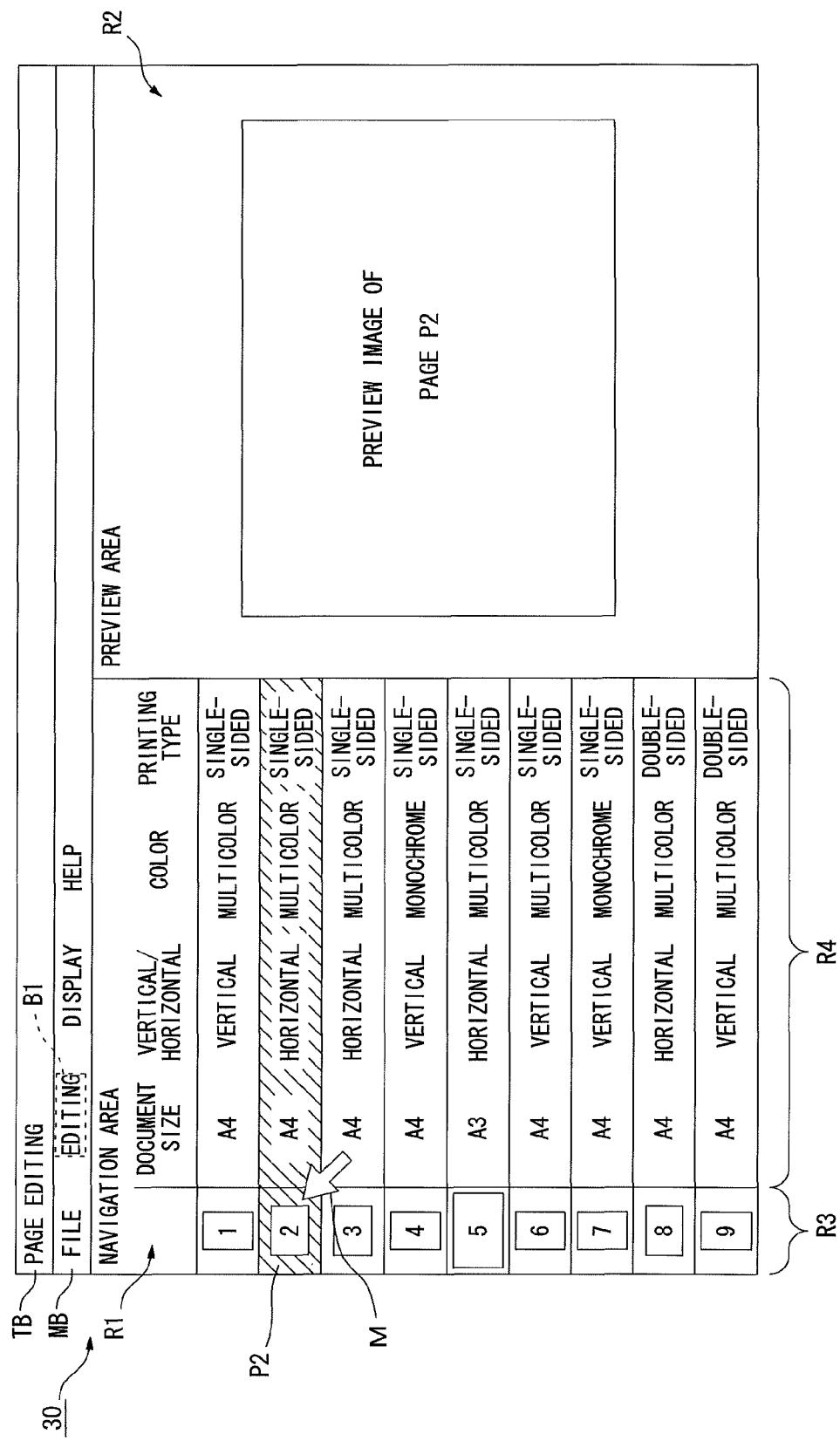
FIG. 4 shows an example of a display screen displayed on a display unit by a display processor, which is an initial screen before a user performs editing operation.

FIG. 4 shows an example of a display screen 30 displayed on the display unit 3 by the display processor 22, which is an initial screen before a user performs editing operation. The display screen 30 includes a title bar TB in its uppermost portion, and a menu bar MB under the title bar TB. The menu bar MB has various menu buttons operable by a user, including an editing button B1 used for editing operation of a page selected by the user.

A display area under the menu bar MB is divided into two portions. The left display area is a navigation area R1 in which multiple pages contained in the document file 16 are displayed in list form to help a user for selecting at least one page to be edited from the multiple pages. The right display area is a preview area R2 in which a page selected by the user in the navigation area R1 is displayed in an enlarged manner. In the example shown in FIG. 4, a user operates the mouse 4*b* to select page P2 on the second page in the navigation area R1 with a mouse pointer M, and the preview area R2 displays the preview image of page P2.

Multiple pages are displayed in list form in a direction from top to bottom in the navigation area R1. When a large number of pages are contained in the document file 16, a scroll bar or the like is additionally provided to enable scrolling through the list. The navigation area R1 includes a thumbnail image display field R3 in which the thumbnail image of each page is displayed, and an attribute information display field R4 in which the attribute information 18 allocated to each page is displayed. Then, the attribute information 18 of each page is displayed in association with the thumbnail image of the corresponding page. So, when a user selects at least one page to be edited from multiple pages displayed in list form, the user is allowed to see the attribute information 18 of each page. As discussed above, the example of FIG. 4 shows a user is selecting page P2 on the second page. When the user selects a page to be edited, the selected page is displayed in a different manner from that of displaying unselected pages, so that the selected page is easily identified.

As shown in FIG. 4, a plurality of items included in the attribute information 18 are displayed side by side in the attribute information display field R4. However, as the display width of the attribute information display field R4 is limited, all items included in the attribute information 18 cannot be displayed. So, the display processor 22 selects two or more items to be displayed from a plurality of items included in the attribute information 18, gives priority to the attribute information 18 relating to the selected items to be displayed, and displays this attribute information 18 in the attribute information display field R4. In FIG. 4, four items including "Document Size," "Vertical/Horizontal," "Color," and "Printing Type" are selected from the attribute information 18 shown in FIG. 2, and these selected items are displayed in the attribute information display field R4.

The display processor 22 selects an item to be displayed from a plurality of items included in the attribute information 18 based on an attribute information display list 24 shown in FIG. 3. By the execution of the information processing program 8 by the CPU 10, for example, the attribute information display list 24 is created in the storage unit 15. At the time of its creation in the storage unit 15, the attribute information display list 24 is based on default values defined by the information processing program 8. Each time a user performs page-by-page editing operation, the attribute information display list 24 is updated according to the substance of the editing operation.

FIG. 5 is an example of the attribute information display list 24 shows a state of its creation based on default values. As shown in FIG. 5, ranks and items are stored in one-to-one correspondence in the attribute information display list 24. As an item with the smaller number of ranking has a higher ranking. Therefore as an item is higher in the ranking has a higher priority to be displayed in the attribute information display field R4. So, in the attribute information display list 24 shown in FIG. 5, "Document Size," "Vertical/Horizontal," "Color," and "Printing Type," and following items are selected in this order as items to be displayed from a plurality of items included in the attribute information 18, and are then displayed in the attribute information display field R4 depend on the priority. In the display screen 30 shown in FIG. 4, four items thereby selected are displayed in the attribute information display field R4. In the present preferred embodiment, the leftmost display position in the attribute information display field R4 nearest to the thumbnail image display field R3 is given the highest priority. Display positions on the right side of the leftmost display position are given lower priorities as a distance from the leftmost display position is longer. In the example shown in FIG. 4, only four items can be displayed in the attribute information display field R4. Hence, only the upper four items defined in the attribute information display list 24 are displayed. Alternatively, a scroll bar or the like may additionally be provided to enable horizontal scrolling, so that a fifth-ranked item and items of lower ranks can be displayed.

When a user moves the mouse pointer M to the editing button B1 on the menu bar MB in a state of selecting page P2 on the second page as shown in FIG. 4 and clicks on it, a pull-down menu appears. This pull-down menu has a list of editing operations the user can perform on selected page P2. For example, this menu includes various editing operations including page rotation for rotating the page to change the direction in which the page is laid, color setting operation for changing the color setting of the page, chapter setting operation for changing the chapter setting of the page, and others. The user selects one from these editing operations on the menu and clicks on it. Then, the CPU 10 brings the editing processor 21 into operation to execute editing process of the page information 17 on the selected second page. With the process, the editing processor 21 updates the attribute information 18 allocated to the second page.

As an example, when a user performs page rotation for rotating page P2 90 degrees, the editing processor 21 rotates the page information 17 on the second page 90 degrees to change the direction in which the page information 17 is laid from a horizontal direction to a vertical direction. The editing processor 21 also rewrites the item "Vertical/Horizontal" of the attribute information 18 by changing its value from "horizontal" to "vertical." FIGS. 6A and 6B show a rewriting process of the attribute information 18 as for the case described in above for instance. FIG. 6A shows the attribute information 18 before the editing process is executed. FIG. 6B shows the rewritten attribute information 18 after the editing process is executed. As shown in FIG. 6A, a value "horizontal" is stored in the item "Vertical/Horizontal" of the attribute information 18 before the editing process. As shown in FIG. 6B, the value of the item "Vertical/Horizontal" is rewritten to "vertical" after the editing process, thereby updating the attribute information 18. The page rotating operation has no affect on the plurality of items included in the attribute information 18 except for the item "Vertical/Horizontal." So, the other items other than the item "Vertical/Horizontal" have the same values before and after the editing process.

After the editing processor 21 executes the editing process as discussed above, the display processor 22 updates the display on the display screen 30. For the update of the display on the display screen 30, the display processor 22 changes the order of items of the attribute information 18 displayed in the attribute information display field R4. This is intended to allow a user not only to easily confirm an item of the attribute information 18 rewritten by editing process but also to easily select a page to be edited next. For changing the order of displayed items, the display processor 22 specifies an item of the attribute information 18 rewritten in accordance with the editing process executed by the editing processor 21, and updates the attribute information display list 24 so that this item is given the highest priority. When a user rotates a selected page as discussed above, the item "Vertical/Horizontal" is ranked first on the attribute information display list 24 shown in FIG. 5.

In addition, the display processor 22 also predicts the substance of the next editing operation based on the substance of the editing operation performed by a user. Based on a result of the prediction, the display processor 22 refers to operation-related item information 25 (FIG. 3) stored in the storage unit 15 to specify at least one item associated with the substance of the next editing operation, and updates the attribute information display list 24 in order to display the item at a display position of high priority.

The display processor 22 may predict the next editing operation in many ways. In the present preferred embodiment, the display processor 22 predicts that the previous editing operation will be repeated for the next editing operation when the number of pages a user selected for the previous editing operation is one. In contrast, the display processor 22 predicts that next editing operation will be different from previous editing operation when the number of pages a user selected for the previous editing operation is two or more. When the display processor 22 predicts that the next editing operation will be different from the previous editing operation, the next editing operation should specifically be determined, in response to which an editing operation history information 26 is stored in the storage unit 15. When the display processor 22 predicts that next editing operation will be different from the previous editing operation, the display processor 22 refers to the editing operation history information 26 to specifically predict the substance of the next editing operation, as discussed later. After the substance of the next editing operation is predicted, the display processor 22 refers to the operation-related item information 25.

FIG. 7 shows an example of the operation-related item information 25. The operation-related item information 25 is predefined in the information processing program 8, for example. When the CPU 10 executes the information processing program 8, the operation-related item information 25 is expanded and then stored in the storage unit 15. The operation-related item information 25 may alternatively be stored in the memory 11. As shown in FIG. 7, the operation-related item information 25 provides correspondences between operations performed for each page and items of the attribute information 18 associated with the operations. In the example of FIG. 7, two items including a first important item and a second important item are defined as items associated with each operation. The first important item is given a greater degree of association with an operation than the second important item. As an example, when a user selects a page to be edited to perform page rotation, it is assumed that the user is most likely to see the item "Vertical/Horizontal", and is the second most likely to see the item "Sheet Size" among the attribute information 18 for each page. So, with regard to page rotation, the item "Vertical/Horizontal" is defined as the first important item, and the item "Sheet Size" is defined as the second important item. In the operation-related item information 25, it is also defined other items a user is likely to see as the first and the second important items for each editing operation. For such definition of items, it is at least preferred for the first important item to set an item of which set value is rewritten as a result of the execution of editing operation associated with the first important item.

After the substance of next editing operation is predicted, the display processor 22 refers to the operation-related item information 25 as discussed above to specify the first and the second important items associated with the next editing operation. Then, in order to display these items at display positions of high priorities, the display processor 22 ranks them second and third in the attribute information display list 24, and updates the attribute information display list 24. When either the first or the second important item coincides with a first-ranked item in the attribute information display list 24, the coinciding item is exempted from display so that the same item will not be displayed repeatedly.

Accordingly, when a user selects only page P2 on the second page to perform page rotation as discussed above, the attribute information display list 24 in the state of FIG. 5 is updated to the state of FIG. 8. More specifically, the item "Vertical/Horizontal" as one of a plurality of items included in the attribute information 18 is rewritten by the user's page rotation, so the item "Vertical/Horizontal" is set as a first-ranked item in the attribute information display list 24. Further, as the number of pages the user selected is one, the display processor 22 predicts that page rotation will be repeated for next editing operation. Then, the first and the second important items associated with page rotation are read from the operation-related item information 25. The item "Vertical/Horizontal" of the first important item is the same as the first-ranked item in the attribute information display list 24. So, the first important item is removed from the items to be displayed, and the second important item "Sheet size" is defined as a second-ranked item. The other items are sequentially brought to lower ranks with remaining the order of the previous attribute information display list 24 which of before the update.

Figure 9:
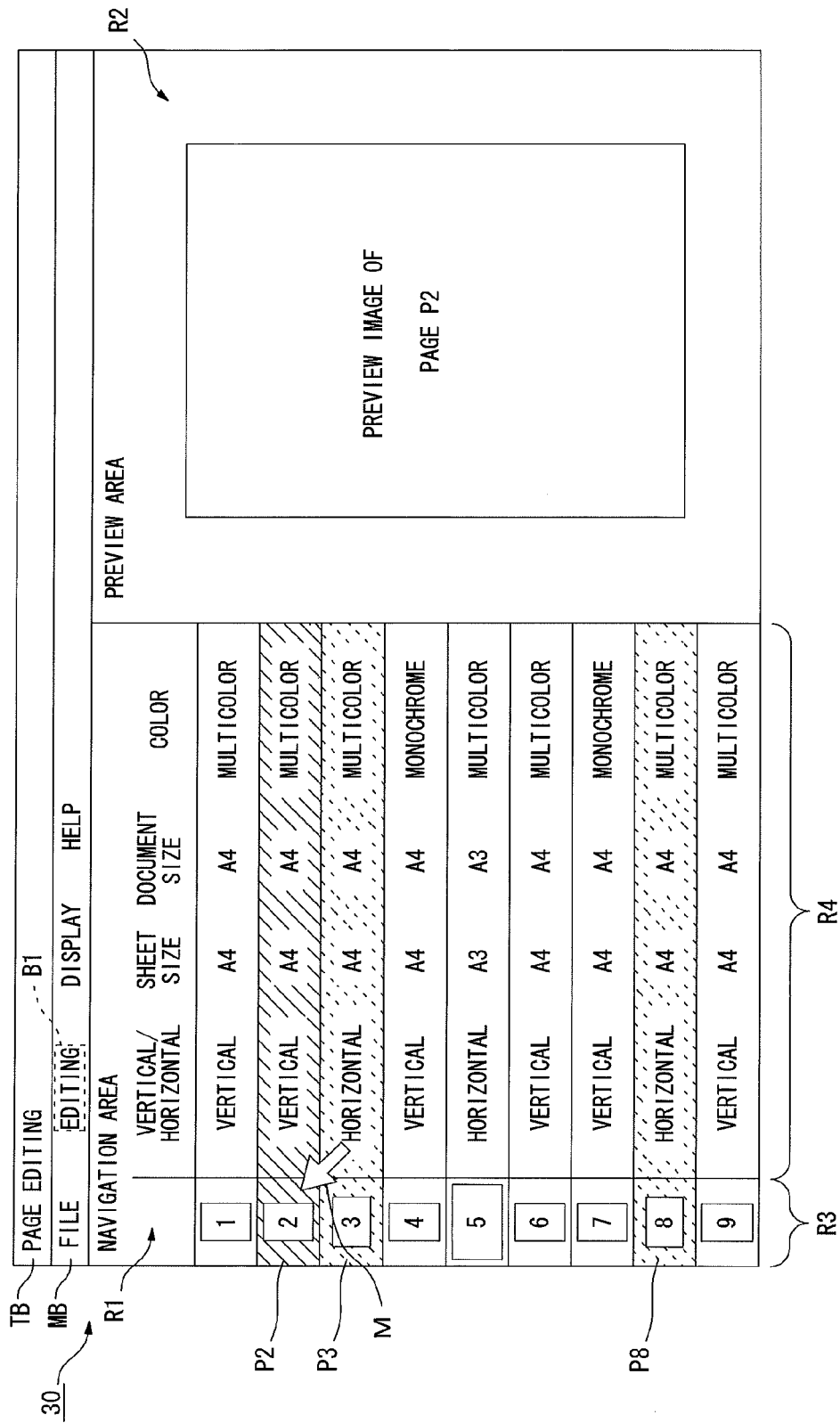
FIG. 9 shows an example of the display screen displayed on the display unit by the display processor, which is a display screen updated after editing operation of one page.

FIG. 9 shows an example of the display screen 30 thereby displayed on the display unit 3 by the display processor 22, which is an exemplary screen updated from the screen shown in FIG. 4 after the user's editing operation of one page. As shown in FIG. 9, by the user's page rotation, the direction in which the thumbnail image of page P2 on the second page is laid is changed from a horizontal direction to a vertical direction in the thumbnail image display field R3 of the navigation area R1. Moreover, in the preview area R2, the direction in which the preview image of selected page P2 on the second page is laid is changed to a vertical direction.

Based on the updated attribute information display list 24 (FIG. 8) as discussed above, the items "Vertical/Horizontal," "Sheet Size," "Document Size," and "Color" are sequentially selected as items to be displayed from a plurality of items of the attribute information 18 allocated to each page. These selected items are displayed in the order corresponding to the display position of high priorities in the attribute information display field R4. Thus, without the need for specific operation, a user is allowed to know that the value of the item "Vertical/Horizontal" has been changed from "horizontal" to "vertical" in the attribute information 18 of page P2 after the editing operation. As a result, it is easily determined whether or not user's intended editing process has properly been performed.

In the attribute information display field R4, the items "Vertical/Horizontal" and "Sheet Size" associated with page rotation predicted to be next editing operation are displayed at display positions of high priorities. So, when a user selects another page to perform page rotation repeatedly thereon, the user is allowed to see the two items "Vertical/Horizontal" and "Sheet Size" associated with page rotation as the attribute information 18 of pages from which the target page is selected without any specific operation after performing the previous editing operation. As a result, a page targeted for the next editing operation is efficiently and easily selected.

The display screen 30 shown in FIG. 9 is the state soon after the screen update by performing the editing process on page on the second page. So, page P2 on the second page remains the state of selected, and the selected state thereof is shown by decorating a display area of page P2 in a certain color, for example.

On the display screen 30 shown in FIG. 9, display areas of page P3 on the third page and of page P8 on the eighth page are decorated for example in a different color from those of display areas of other pages. The reason for decorating pages P3 and P8 on the third and eighth pages in even another color to distinguish from other pages is for a user to avoid the omission of editing operation. Such decorations are intended to realize highlighted display in order for a user to determine whether or not the previous editing operation should be repeated.

This highlighted display is discussed in more detail as follows. When the editing processor 21 performs page editing process in response to editing operation performed by a user, the display processor 22 specifies the substance of the executed editing operation, and refers to the operation-related item information 25 to specify two items including the first and the second important items associated with the executed editing operation. Then, the display processor 22 makes comparison between the values of these two items of the attribute information 18 of an edited page before the attribute information 18 thereof is updated, and the values of these two items of the attribute information 18 of other pages. The display processor 22 thereafter extracts all such pages which have the same values of each item of the attribute information 18 as the values of the edited page. In the example of FIG. 9, page P2 on the second page is subjected to editing operation. The value of the first important item "Vertical/Horizontal" and the value of the second important item "Sheet Size" associated with page rotation are "horizontal" and "A4" before the editing operation. So, pages having the attribute information 18 of the value "horizontal" for the item "Vertical/Horizontal," and of the value "A4" for the item "Sheet Size," are all extracted. Thus, pages P3 and P8 on the third and eighth pages are extracted. The display processor 22 thereafter highlights the display areas of the extracted pages.

As discussed, in the list displayed in the navigation area R1, at least one page other than an edited page is highlighted that has an item of the same value of the attribute information 18 as that of the item of the attribute information 18 of the edited page before being subjected to page editing process. Thus, after the execution of one editing operation, a user is required to see only a highlighted page to determine whether or not this editing operation should be repeated for another page. This results not only in the improvement of working efficiency but also in a lower probability of overlooking another target page to be applied the same editing operation. Thus, the omission of editing operation for each page is effectively avoided.

The example here described the case of when at least one page other than an edited page which has the same values of the first and the second important items as those of the edited page before being subjected to page editing process are extracted with reference to the operation-related item information 25, and operating the highlighted display for the extracted page. As another example, regarding an rewritten item as a result of editing process, it may also structured to extract all such pages other than the edited page have the same value of the items as which of an edited page before being rewritten and to operate highlighted display.

Figure 10:
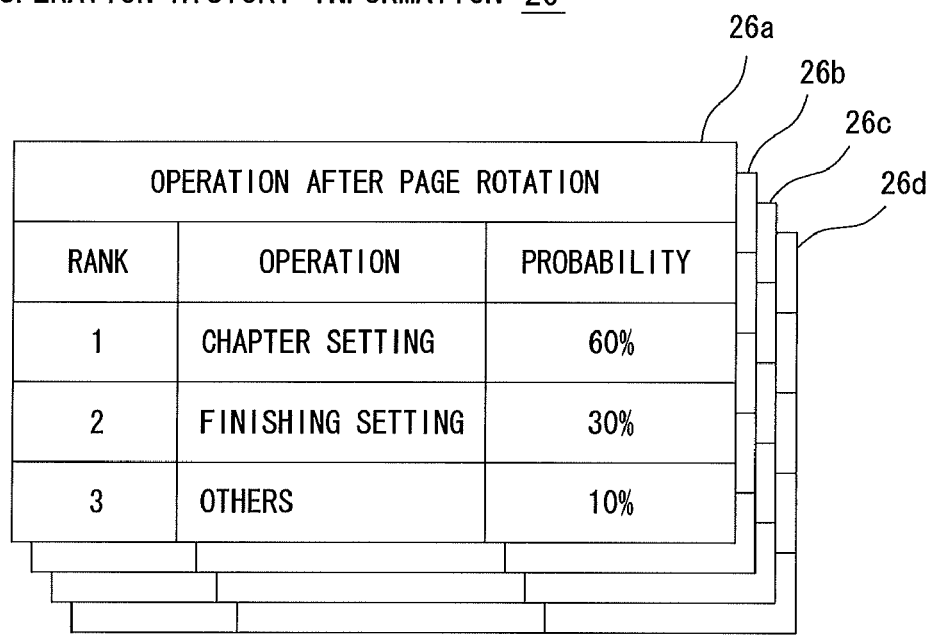
FIG. 10 is an example of editing operation history information.

In the case discussed next, the number of pages a user selected for previous editing operation is two or more, and the display processor 22 predicts that next editing operation will be different from the previous one. FIG. 10 is an example of the editing operation history information 26. The editing operation history information 26 is created in the storage unit 15 when the information processing program 8 is executed for the first time in the information processing device 1, for example. The content of the editing operation history information 26 is hold therein after the termination of the information processing program 8 in the information processing device 1. As shown in FIG. 10, the editing operation history information 26 includes history information 26a, 26b, 26c, 26d, . . . defined for corresponding each editing operations performed by a user. When a user performs editing operations of selected pages, the history information 26a, 26b, 26c, 26d, . . . corresponding to the respective editing operations are updated, if necessary. In the example of FIG. 10, the history information 26a contains history information relating to operations after page rotation. The history information 26a is created by piling the numbers of editing operations a user performed after page rotation per operation, and by statistically processing the piled data. The history information 26a is of table form in which operations likely to be performed after page rotation are ranked, and the substance of editing operation in each rank and the probability of execution of the editing operation are associated with each other. In the present preferred embodiment, the editing processor 21 creates and updates the editing operation history information 26. The display processor 22 specifies the next editing operations in detail by referring to the created and updated editing operation history information 26 sequentially.

As an example, if a user selected two or more pages and performed page rotation last time, the display processor 22 refers to the editing operation history information 26 shown in FIG. 10 to specify the operation relating to "Chapter Setting" with the highest probability as next editing operation. After the substance of next editing operation is predicted in this way, the same process as that performed after editing process of one page is followed. That is, the display processor 22 refers to the operation-related item information 25 to specify the first and the second important items associated with the predicted next editing operation. As an example, when "Chapter Setting" is specified as next editing operation, the display processor 22 refers to the operation-related item information 25 shown in FIG. 7 to specify the item "Chapter" as the first important item and the item "Front/Back" as the second important item. Then, in order to display these items at display positions of high priorities, the display processor 22 ranks these items second and third in the attribute information display list 24 and update the attribute information display list 24.

Accordingly, when a user selects two or more pages including page P2 on the second page and page P3 on the third page to perform page rotation, the attribute information display list 24 in the state of FIG. 5 is updated to the state of FIG. 11. Therefore, the item "Vertical/Horizontal" as one of a plurality of items included in the attribute information 18 is rewritten by the user's page rotation. So, the item "Vertical/Horizontal" is changed to a first-ranked item in the attribute information display list 24. Further, as the number of pages the user selected is two or more, the display processor 22 predicts that next editing operation will be "Chapter Setting" based on the editing operation history information 26. Then, the first and the second important items associated with chapter setting are read from the operation-related item information 25, so that the items "Chapter" and "Front/Back" are defined as a second-ranked item and a third-ranked item respectively in the attribute information display list 24. The other items are sequentially brought to lower ranks.

Figure 12:
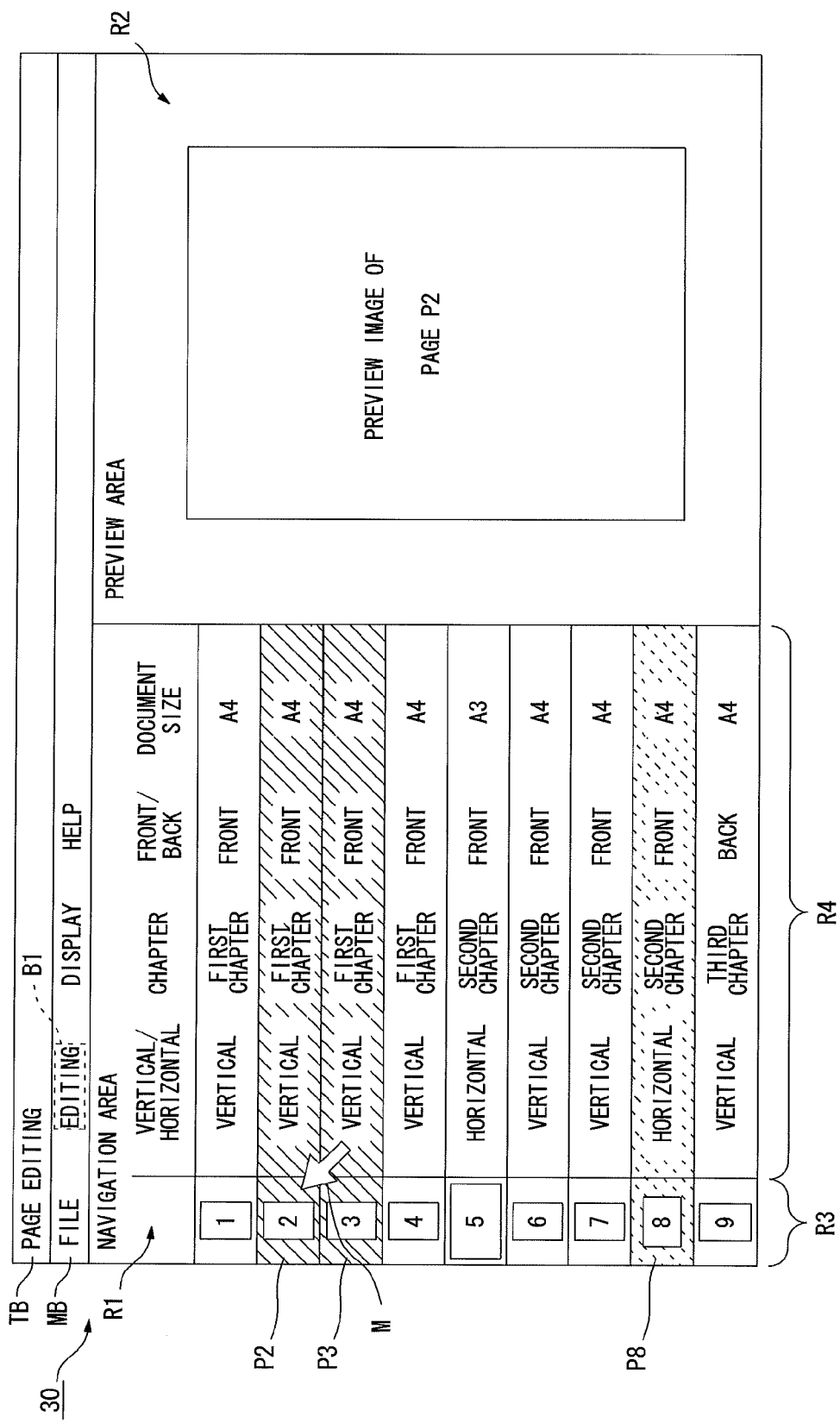
FIG. 12 shows an example of the display screen displayed on the display unit by the display processor, which is a display screen updated after editing operation of two or more pages.
Figure 13:
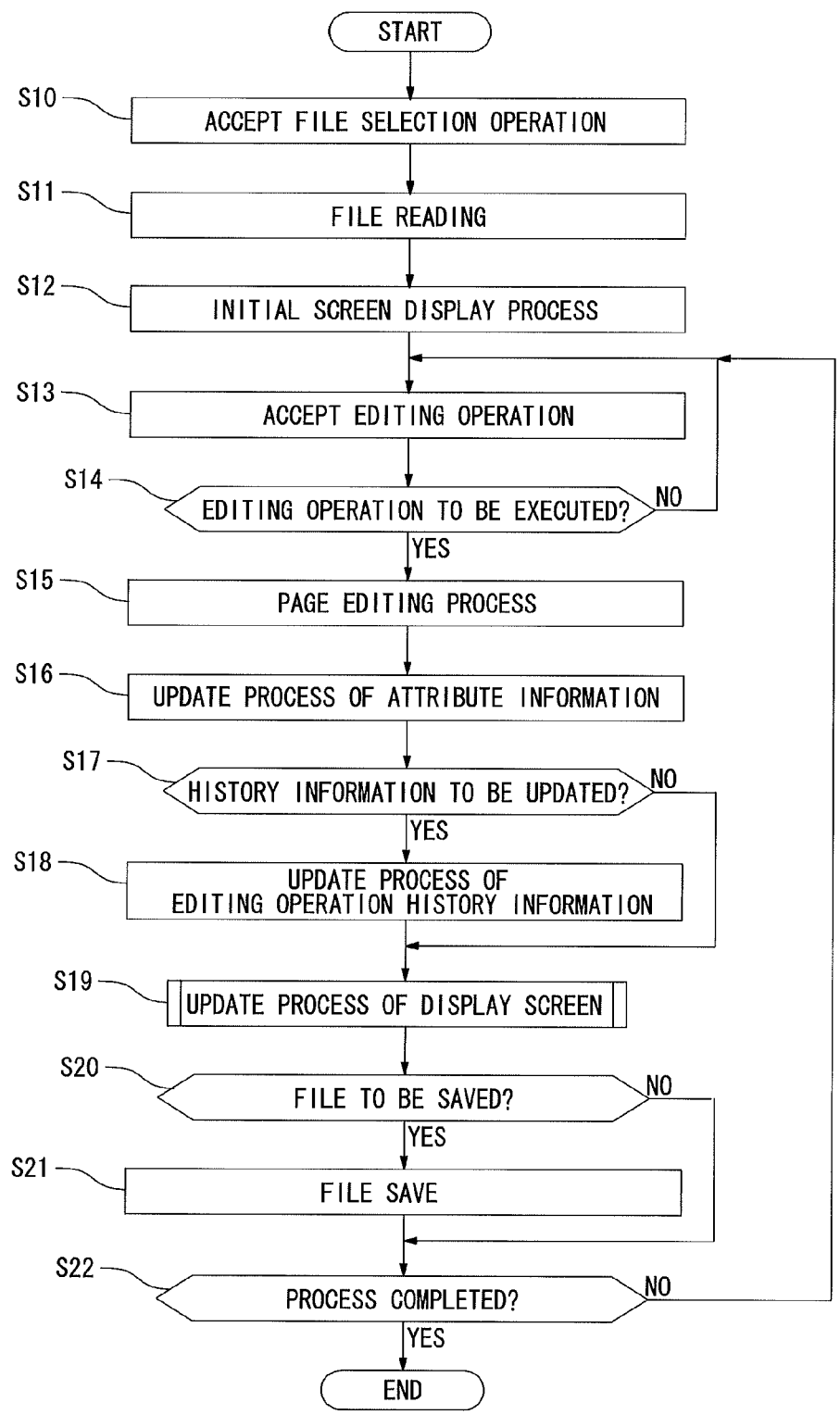
FIGS. 13 to 16 are flow diagrams showing the sequence of process in the information processing device.

FIG. 12 shows an example of the display screen 30 thereby displayed on the display unit 3 by the display processor 22, which is an exemplary screen updated after the user's editing operation of two or more pages. As shown in FIG. 12, by the user's page rotation, directions in which each of the thumbnail images of page P2 on the second page and page P3 on the third page are laid are changed from a horizontal to a vertical direction in the thumbnail image display field R3 of the navigation area R1. In the preview area R2, the direction in which the preview image of selected page P2 on the second page is laid is changed to a vertical direction. If the mouse pointer M is moved to page P3 on the third page to select page P3, the preview area R2 displays the preview image of page P3 which of the direction page P3 is laid is changed from a horizontal to vertical direction.

Based on the updated attribute information display list 24 (FIG. 11) according to the process discussed above, the items "Vertical/Horizontal," "Chapter," "Front/Back," and "Document Size" are sequentially selected as items to be displayed from a plurality of items of the attribute information 18 allocated to each page. These selected items are arranged to be displayed along with the order of display positions of decreasing priority in the attribute information display field R4. Thus, after the editing operation, a user is allowed to know that the value of the item "Vertical/Horizontal" has been changed from "horizontal" to "vertical" in the attribute information 18 of pages P2 and P3 without the need for specific operation. As a result, it is easily determined whether or not user's intended editing process has properly been performed.

In the attribute information display field R4, the items "Chapter" and "Front/Back" associated with chapter setting as next editing operation are ranked and displayed at the second and the third display positions of high priorities. So, when a user selects a target page to perform chapter setting thereon, the user is allowed to see, without the need for specific operation after the execution of previous editing operation, the two items "Chapter" and "Front/Back" associated with page chapter setting and constituting the attribute information 18 of pages from which the target page is selected. As a result, a page targeted for next editing operation is efficiently and easily selected.

On the display screen 30 shown in FIG. 12, a display area of page P8 on the eighth page is also highlighted in order for a user to determine whether or not editing operation performed last time should be repeated, thereby avoiding the omission of user's editing operation. This highlighted display is the same as that of after editing process of one page. This highlighted display is performed on a page other than an edited page that has the same value of an item of the attribute information 18 as the value of the item of the edited page before being subjected to page editing process. Thus, after the execution of one editing operation, a user is required to see only a highlighted page to determine whether or not this editing operation should be repeated for another page. This results not only in the improvement of working efficiency but also a lower probability of overlooking another target page to be applied the same editing operation. Thus, the omission of editing operation for each page is effectively avoided.

The topic discussed next is the practical operation in the information processing device 1 for performing screen update described above. FIGS. 13 to 16 are flow diagrams showing an example of the sequence of process in the information processing device 1. The information processing program 8 is read from the storage unit 15 and executed by the CPU 10 to perform the process.

When the information processing device 1 starts this process, the information processing device 1 first accepts user's file selection operation (step S10). If a plurality of document files 16 is stored in the storage unit 15, the user selects a document file 16 to be edited. After a document file 16 is selected by the user, the CPU 10 reads the selected document file 16 from the storage unit 15 (step S11), and performs initial screen display process for displaying an initial screen on the display unit 3 (step S12). As a result, the display screen 30 shown in FIG. 4 is displayed on the display unit 3. So, the information processing device 1 is allowed to accept the user's page selection operation and the user's editing operation on a selected page through the manipulation input unit 4 (step S13).

The user operates the manipulation input unit 4 while viewing the display screen 30 shown in FIG. 4 to select at least one page to be edited from multiple pages displayed in list form in the navigation area R1. At this time, both the editing processor 21 and the display processor 22 are in functional state. When the editing processor 21 receives a page selection operation, the editing processor 21 specifies a page to be edited selected from multiple pages contained in the document file 16, and outputs information relating to the specified page to the display processor 22. The display processor 22 changes the display condition of the selected page based on this information to show that this page is in selected state, and displays the selected page in an enlarged manner in the preview area R2. This step is repeatedly operated until the user performs editing operation (a result of step S14 continues to be NO). When the user performs editing operation on the selected page, it considered the operation as the instructions to perform editing process are given by the user's editing operation (a result of step S14 is YES). Then, the editing processor 21 reads the page information 17 of the page selected by the user from the storage unit 15, and performs editing process in response to the editing operation performed by the user (step S15). By way of example, if the editing operation performed by the user is page rotation, the page information 17 is rotated. After the page editing process, the editing processor 21 updates the attribute information 18 allocated to the page information 17 of the page selected by the user (step S16). Here, of a plurality of items contained in the attribute information 18, an item associated with the executed editing operation is rewritten to update the attribute information 18.

Next, the editing processor 21 determines whether or not the editing operation history information 26 should be updated (step S17). Here, a result of step S17 is NO if editing operation is performed for the first time after reading of the document file 16. A result of step S17 is YES if editing operation is performed for the second time or more after the reading of the document file 16. In the case of editing operation performed for the second time or more, the editing processor 21 reads the editing operation history information 26 from the storage unit 15, increments the number of editing operation performed this time to the history information (which is any one of 26a, 26b, 26c, 26d, . . . ) corresponding to the previous editing operation, and performs arithmetic processing. As a result, the editing processor 21 obtains the probability of next operation to be performed subsequently to the previous operation and writes this probability into the editing operation history information 26, thereby updating the editing operation history information 26 (step S118). After completing the update of the editing operation history information 26, the flow moves on to step S19.

Figure 14:
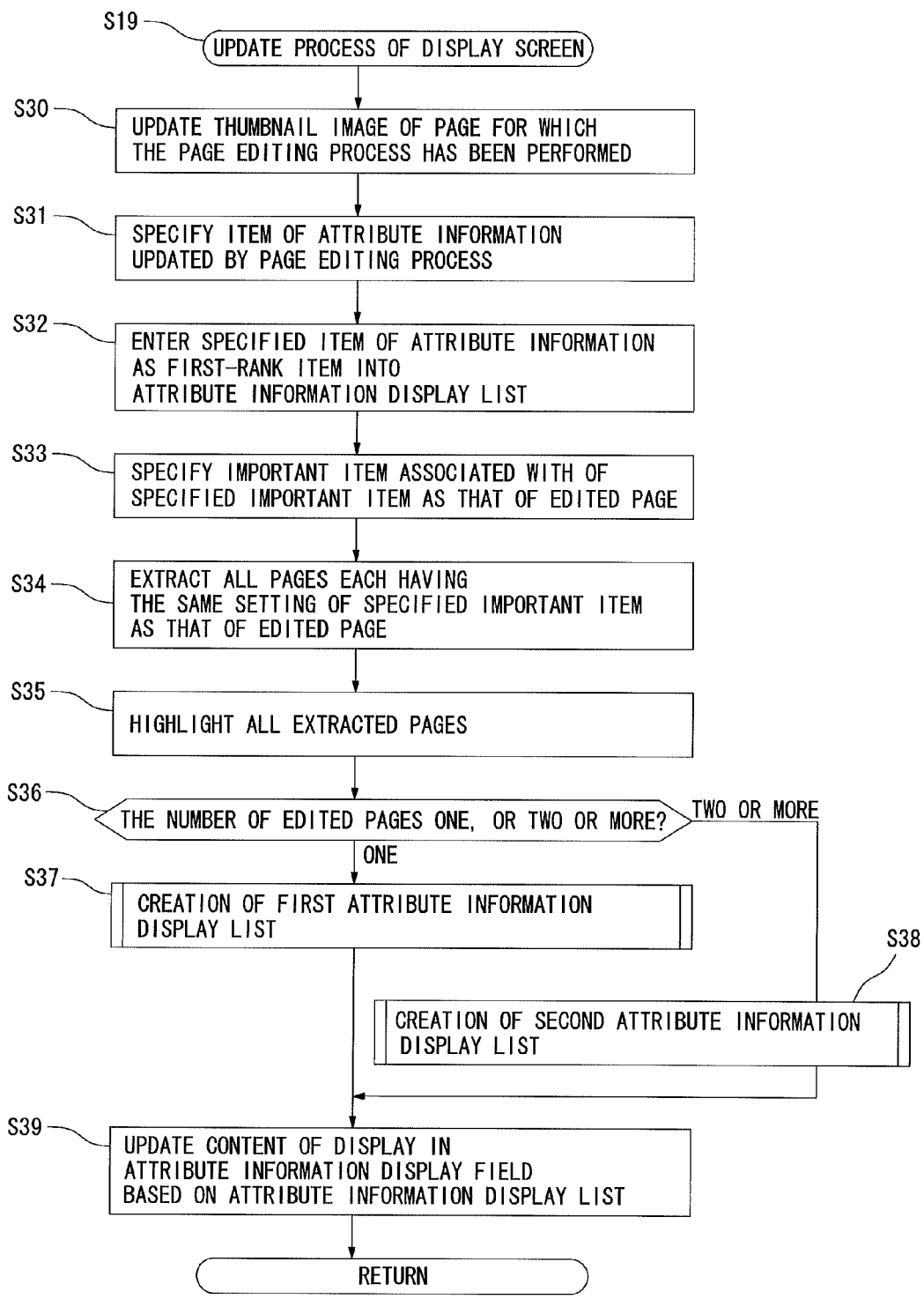

In step S19, the display processor 22 performs a display screen update process. In the display screen update process (step S19), the process based on the flow diagram of FIG. 14 is performed. First, the display processor 22 updates the thumbnail image of a page for which the page editing process has been performed to a thumbnail image reflecting a result of editing (step S30). At this time, a preview image in the preview area R2 is preferably updated simultaneously.

In order to easily confirm an item of the attribute information 18 rewritten with the page editing process, the display processor 22 thereafter specifies an item rewritten in accordance with the execution of the page editing process that is one of a plurality of items contained in the attribute information 18 of the selected page (step S31). Then, the display processor 22 enters the specified item of the attribute information 18 as a first-rank item of the attribute information display list 24 (step S32).

Next, based on the operation-related item information 25, the display processor 22 specifies the first and the second important items associated with the substance of the editing operation performed on the page selected by the user (step S33). This is intended to perform highlighted display in order to avoid omission of editing operation. Then, all such pages other than the edited page and each of which has the specified items of the same set values as those of the edited page before being subjected to the page editing process are extracted (step S34). Thereafter it highlights the extracted pages of the list displayed in the navigation area R1 by for example, decorating in a different color from the display areas of the other pages for the display areas of all the pages extracted in step S34 (step S35).

Next, in order to predict the next editing operation, the display processor 22 determines whether the number of pages after being subjected to the editing process is one, or two or more (step S36). If the number of pages after being subjected to the editing process is one, the flow moves on to the creation of the first attribute information display list (step S37). If the number of pages after being subjected to the editing process is two or more, the flow moves on to the creation of the second attribute information display list (step S38).

Figure 15:
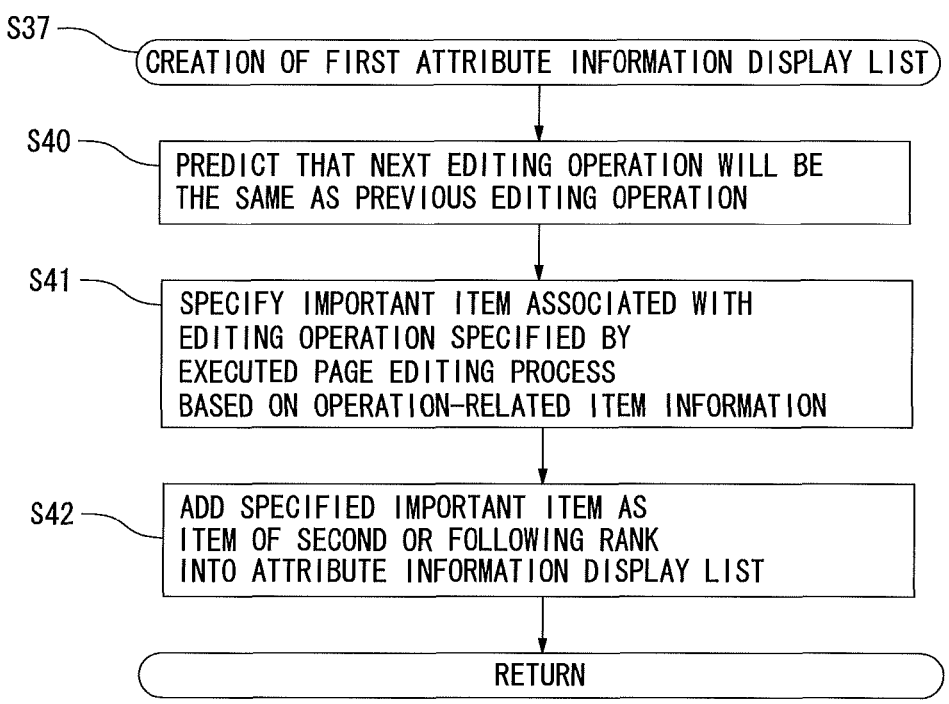

The creation of the first attribute information display list is discussed first. The process in the creation of the first attribute information display list (step S37) is based on the flow diagram shown in FIG. 15. Here, the number of pages after being subjected to the editing process is one, so the display processor 22 predicts that the previous editing operation will be repeated for the next editing operation to be performed by the user (step S40). Then, based on the operation-related item information 25, the display processor 22 specifies the first and the second important items associated with the editing operation specified by the executed page editing process (namely, the editing operation performed most recently by the user) (step S41). The display processor 22 thereafter adds items corresponding to the specified the first and the second important items into a second and a following rank of the attribute information display list 24 (step S42). When either the first or the second important item coincides with a first-ranked item which has already been entered in the attribute information display list 24, the coinciding important item is removed from the subject of the entry into the attribute information display list 24. The process based on the flow diagram shown in FIG. 15 is thus completed, and the flow returns to the flow diagram shown in FIG. 14.

Figure 16:
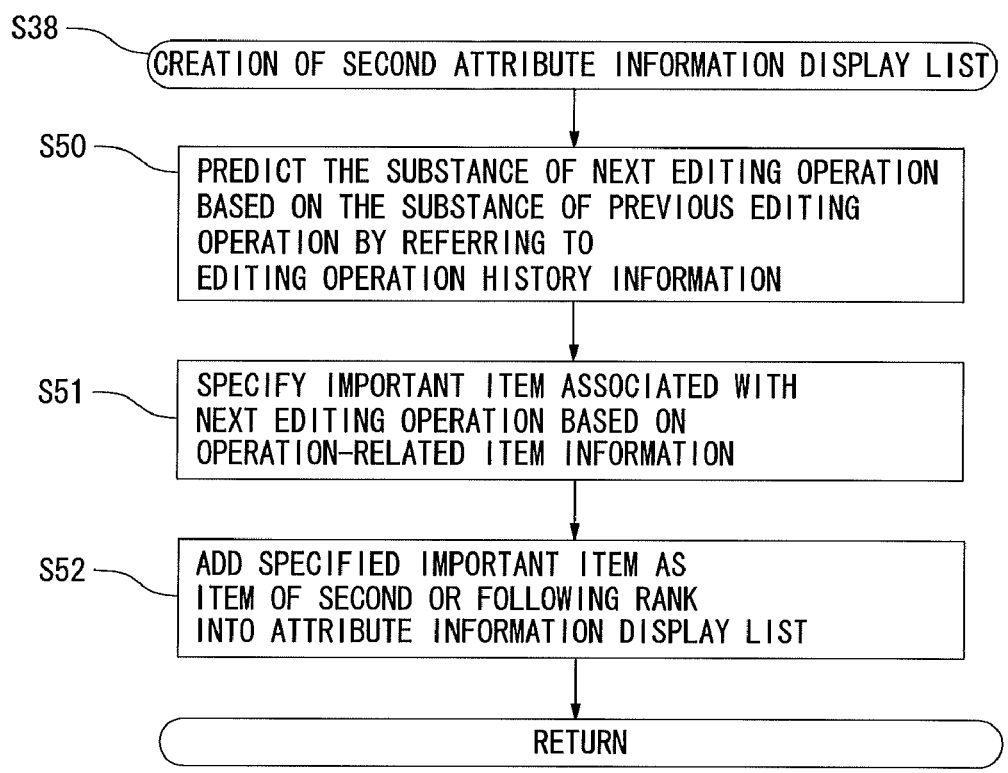

The creation of the second attribute information display list is discussed next. The process in the creation of the second attribute information list (step S38) is based on the flow diagram shown in FIG. 16. Here, the number of pages after being subjected to the editing process is two or more. So, the probability is high to be performed the operation different from the previous operation, and is low to be repeatedly performed the previous operation. Then, the display processor 22 refers to the editing operation history information 26 to predict the substance of next editing operation based on the substance of the previous editing operation specified by the executed page editing process (step S50). Namely, the display processor 22 specifies editing operation from a track record of operations in the past that is most likely to be performed subsequently to the previous editing operation, and predicts that the specified operation will be the next editing operation. Thereafter the display processor 22 specifies the first and the second important items associated with the predicted next editing operation based on the operation-related item information 25 (step S51). Next, the display processor 22 adds items corresponding to the specified the first and the second important items into a second and a following rank of the attribute information display list 24 (step S52). Again, when either the first or the second important item coincides with a first-ranked item which has already been entered in the attribute information display list 24, the coinciding important item is removed from the subject of the entry into the attribute information display list 24. The process based on the flow diagram shown in FIG. 16 is thus completed, and the flow returns to the flow diagram shown in FIG. 14.

Next, the display processor 22 sets items of the attribute information 18 to be displayed in the attribute information display field R4 of the navigation area R1 based on the attribute information display list 24 updated in step S37 or S38, and updates the content of display in the attribute information display field R4 (step S39). As a result, the attribute information display field R4 in the navigation area R1 is updated for example from the state of FIG. 4 to the state of FIG. 9 or FIG. 12. The process based on the flow diagram shown in FIG. 14 is thus completed, and the flow returns to the flow diagram shown in FIG. 13.

The CPU 10 determines whether or not the user instructed to save the document file 16 (step S20). If the user instructed the file save, the CPU 10 saves the document file 16 which has been a subject of the page editing process (step S21), thereafter the flow moves on to step S22. If the user did not instruct the file save, the flow directly moves on to step S22.

The CPU 10 thereafter determines whether or not the user gave instructions to complete the information processing program 8 (step S22). If the user gave instructions for completion, the process completes here. If the user did not give instructions for completion, the flow returns to step S13 to continue editing operation with the display screen on the display unit 3 updated. As the loop iteration of the process from step S13 to step S22, the user is allowed to perform intended page-by-page editing operation while successively changing a page to be edited.

As discussed above, in the present preferred embodiment, the editing processor 21 executes page editing process specified by editing operation performed on a page selected by a user. Based on the substance of the editing operation, the display processor 22 thereafter selects items of the attribute information 18 to be displayed in the navigation area R18, and places the selected items in the navigation area R1, thereby updating a display item list of the attribute information 18. Thus, the need for a user to change an item of the attribute information 18 to be displayed by hand is reduced. This leads to improved operability in selecting a page to be edited from multiple pages contained in the document file 16, and a user is allowed to efficiently select a page to be edited. Even after the execution of editing process, the user is also allowed to confirm a result of editing reflected in the attribute information 18 without changing an item of the attribute information 18 to be displayed by hand. As a result, operability in page-by-page editing operation of the document file 16 consisted of multiple pages is considerably improved.

In order to update the display item list of the attribute information 18 in the navigation area R1, the display processor 22 predicts the substance of the next editing operation based on the substance of the previous editing operation specified by executed page editing process. Based on the predicted substance of the next editing operation, the display processor 22 updates the display item list of the attribute information 18. Thus, even when the next editing operation to be performed by a user is different from the previous one, the need for the user to change an item of the attribute information 18 to be displayed by hand is reduced in case of selecting a page to be edited for next operation, thereby improving operability.

The display processor 22 reads a plurality of important items from the operation-related item information 25 that are associated with editing operation specified by the page editing process which was executed by the editing processor 21. The display processor 22 changes the manner of display between one page and another page both different from a selected page; the set values of these important items of the former page are the same as those of the selected page before being subjected to page editing process, while the set values of these important items of the latter page are different from those of the selected page before being subjected to page editing process. Then, the display processor 22 gives decorations to the page with the same values to highlight this page. So, by seeing the highlighted page, a user is allowed to easily find whether there is a page to be subjected to the same editing operation or not, thereby it helps avoiding the omission of selecting a page to be subjected to editing operation. This is usefully applied especially to the case where a large number of pages are contained in the document file 16. Because all the pages cannot be displayed simultaneously in list form in the navigation area R1, a user selects a page to be edited from many pages while scrolling through the list. When a page that has the same set values of the attribute information 18 as those of an edited page before being subjected to the page editing process is highlighted, the user is required to check only the highlighted page, resulting in reduced time for the check.

The present invention is not limited to the preferred embodiment as discussed above.

As an example, in the preferred embodiment discussed above, in order to highlight a page different from a selected page, the display processor 22 reads a plurality of important items associated with editing operation specified by the page editing process which was executed by the editing processor 21 from the operation-related item information 25. Then, the display processor 22 highlights a page different from the selected page the set values of all these important items of which are the same as those of the selected page before being subjected to the page editing process. However, the values of all the important items are not necessarily required to be the same when a page is extracted for highlighting. Namely, in order to perform highlighting, the display processor 22 reads a plurality of important items associated with editing operation specified by the page editing process which was executed by the editing processor 21 from the operation-related item information 25. Then, the display processor 22 may give decorations to highlight a page different from a selected page which has the value of at least one of the important items matches with which of the selected page before being subjected to the page editing process.

In the preferred embodiment discussed above, when predicting the next operation, it makes different predictions depending on the number of pages subjected for the previous editing process whether it was one, or two or more. The criteria for prediction are not limited to the number of the pages one, or two or more. It is also possible to employ other criteria, for instance, editing operation may be performed with all even-numbered pages selected from multiple pages contained in the document file 16, so two or more pages will be subjected to editing process. Even in this case, it is considered that the user is likely to select the odd-numbered pages and to repeatedly perform the same editing operation as the previous one to the selected pages. Similarly to the operation performed to one page discussed above, it may also structured to make prediction that the next editing operation is going to be the same as the previous one when the previous editing operation is performed with all even-numbered pages selected or with all odd-numbered pages selected.

It may also structured the editing operation history information 26 to tally the number of times when the same operation was repeatedly performed. If so, it enables to make prediction for the next operation by determining whether it is likely to be performed the same operation as the previous one or the different operation from the previous one based on the editing operation history information 26. This criterion may also be applied to predict next operation.

In the preferred embodiment discussed above, in the prediction of next editing operation, one editing operation is predicted to be performed. Alternatively, two or more editing operations may be predicted to be performed next. As an example, in the editing operation history information 26 shown in FIG. 10, editing operations to be performed next are ranked in order of decreasing probability. So, editing operations of a certain rank and of ranks higher than that may all be predicted to be next editing operations. Alternatively, editing operations with a certain probability and with probabilities higher than that may all be predicted to be next editing operations. When two or more editing operations are predicted to be performed next, associated items are preferably added to the attribute information display list 24 in response to ranks of the next editing operations.

In the preferred embodiment discussed above, different predictions on the next editing operation are made based on whether the number of pages executed editing process previously is one, or two or more. In this case, the creation of the second attribute information display list (step S38) may be performed subsequently to the creation of the first attribute information display list (step S37) when the number of pages is one. Further, the creation of the first attribute information display list (step S37) may be performed subsequently to the creation of the second attribute information display list (step S38) when the number of pages is two or more. So, more items associated with both previous and next operation can be bed displayed in the navigation area R1.

While the invention has been shown and described in detail, the foregoing description is in all aspects illustrative and not restrictive. It is therefore understood that numerous modifications and variations can be devised without departing from the scope of the invention.

What is claimed is:

1. An information processing program stored on a computer readable medium for causing a computer to perform page-by-page editing of a document file having multiple pages to each of which attribute information with a plurality of items is allocated, said information processing program causing said computer to execute processing the steps of:
   (a) displaying said multiple pages of said document file in list form on a display unit, selecting at least one item to be displayed as a display item list from said plurality of items of said attribute information, and displaying said attribute information relating to said at least one item in association with each page;
   (b) receiving page selection operation and editing operation on a selected page entered through a manipulation input unit, specifying the page to be edited selected from said multiple pages, executing editing process on the specified page based on said editing operation, and updating said attribute information by rewriting an item associated with said editing operation of said attribute information allocated to said specified page; and
   (c) selecting at least one item to be displayed from said plurality of items of said attribute information based on the substance of said editing operation, and thereby updating said attribute information displayed on said display unit as said display item list in step (a) by updating manner of display of said selected at least one item.

2. The information processing program according to claim 1, wherein
   in said step (c), said item of said attribute information rewritten in said step (b) is displayed on a priority basis in updating said attribute information displayed on said display unit.

3. The information processing program according to claim 1, wherein
   said information processing program further causes said computer to execute the step of:
   (d) storing operation-related item information into a storage unit, said operation-related item information defining an important item associated with each page editing operation, and
   in said step (c), said important item associated with said editing operation performed in said step (b) is read from said operation-related item information to update said attribute information displayed on said display unit.

4. The information processing program according to claim 1, wherein
   in said step (c), the substance of next editing operation is predicted based on the substance of said editing operation, and said attribute information for display is updated based on the substance of the predicted next editing operation.

5. The information processing program according to claim 4, wherein
   said information processing program further causes said computer to execute the step of:
   (d) storing operation-related item information into a storage unit, said operation-related item information defining an important item associated with each page editing operation, and
   in said step (c), after the substance of next editing operation is predicted based on the substance of said editing operation, said important item associated with the predicted next editing operation is read from said operation-related item information to update said attribute information for display.

6. The information processing program according to claim 4, wherein
   in said step (b), each time said editing process is executed, the substance of next editing operation performed subsequently to previous editing operation is recorded into editing operation history information stored in a storage unit, and
   in said step (c), the substance of next editing operation is predicted based on said editing operation history information.

7. The information processing program according to claim 1, wherein
   in said step (c), said multiple pages are displayed in list form while, regarding said item of said attribute information rewritten by said editing process in said step (b), manner of display is distinguished one page having the set value of said item of which is the same as that of said specified page before being subjected to said editing process, from another page having the set value of said item of which is different from that of said specified page before being subjected to said editing process.

8. The information processing program according to claim 1, wherein
   said information processing program further causes said computer to execute the step of:
   (d) storing operation-related item information into a storage unit, said operation-related item information defining a plurality of important items associated with each page editing operation, and
   in said step (c), said plurality of important items associated with said editing operation performed in said step (b) are read from said operation-related item information, and said multiple pages are displayed in list form while, regarding at least one item of said plurality of important items, manner of display is distinguished one page having the set value of said item of which is the same as that of said specified page before being subjected to said editing process, from another page having the set value of said item of which is different from that of said specified page before being subjected to said editing process.

9. An information processing method of performing page-by-page editing on a document file having multiple pages to each of which attribute information with a plurality of items is allocated, said method comprising the steps of:
   (a) displaying said multiple pages of said document file in list form on a display unit, selecting at least one item to be displayed from said plurality of items of said attribute information, and displaying said attribute information relating to said at least one item in association with each page;

(b) receiving page selection operation and editing operation on a selected page, specifying the page to be edited selected from said multiple pages, executing editing process on the specified page based on said editing operation, and updating said attribute information by rewriting an item associated with said editing operation of said attribute information allocated to said specified page, and (c) selecting at least one item to be displayed from said attribute information based on the substance of said editing operation, and thereby updating said attribute information displayed on said display unit by updating manner of display of said selected at least one item.

10. The information processing method according to claim 9, wherein in said step (c), said multiple pages are displayed in list form while, regarding said item of said attribute information rewritten by said editing process in said step (b), manner of display is distinguished one page having the set value of said item of which is the same as that of said specified page before being subjected to said editing process, from another page having the set value of said item of which is different from that of said specified page before being subjected to said editing process.

11. The information processing method according to claim 9, wherein in said step (c), said item of said attribute information rewritten in said step (b) is displayed on a priority basis in updating said attribute information displayed on said display unit.

12. The information processing method according to claim 9, further comprising the step of storing operation-related item information into a storage unit, said operation-related item information defining an important item associated with each page editing operation, wherein in said step (c), said important item associated with said editing operation performed in said step (b) is read from said operation-related item information to update said attribute information displayed on said display unit.

13. The information processing method according to claim 9, wherein in said step (c), the substance of next editing operation is predicted based on the substance of said editing operation, and said attribute information displayed on said display unit is updated based on the substance of the predicted next editing operation.

14. The information processing method according to claim 13, further comprising the step of storing operation-related item information into a storage unit, said operation-related item information defining an important item associated with each page editing operation on a page, wherein in said step (c), after the substance of next editing operation is predicted based on the substance of said editing operation, said important item associated with the predicted next editing operation is read from said operation-related item information to update said attribute information for display.

15. The information processing method according to claim 13, wherein in said step (b), each time said editing process is executed, the substance of next editing operation performed subsequently to previous editing operation is entered into editing operation history information stored in a storage unit, and in said step (c), the substance of next editing operation is predicted based on said editing operation history information.

16. The information processing method according to claim 9, further comprising the step of storing operation-related item information into a storage unit, said operation-related item information defining a plurality of important items associated with each page editing operation, wherein in said step (c), said plurality of important items associated with said editing operation performed in said step (b) are read from said operation-related item information, and said multiple pages are displayed in list form while, regarding at least one item of said plurality of important items, manner of display is distinguished one page having the set value of said item of which is the same as that of said specified page before being subjected to said editing process, from another page having the set value of said item of which is different from that of said specified page before being subjected to said editing process.

17. An information processing device for performing page-by-page editing on a document file having multiple pages to each of which attribute information with a plurality of items is allocated, said information processing device comprising:

a storage unit for storing therein said document file;

a display unit for performing display based on said document file;

a manipulation input unit for performing page selection operation to select a page to be edited from said multiple pages of said document file, and editing operation on a selected page;

a display processor for reading said document file from said storage unit, displaying said multiple pages of said document file in list form on said display unit, selecting an item to be displayed from said plurality of items of said attribute information, and displaying said attribute information relating to said item that has been selected in association with each page; and an editing processor for receiving page selection operation and editing operation entered through said manipulation input unit, specifying a page to be edited selected from said multiple pages, performing editing process on the specified page, and updating said attribute information by rewriting an item associated with said editing process of said attribute information allocated to said specified page, after said editing process by said editing processor, said display processor selecting an item to be displayed from said plurality of items of said attribute information based on the substance of said editing process to update said attribute information displayed on said display unit by updating manner of display of said selected item.

18. The information processing device according to claim 17, wherein said display processor displays said multiple pages in list form while, regarding an item of said attribute information rewritten by said editing process by said editing processor, manner of display is changed between one page having the set value of said item of which is the same as that of said specified page before being subjected to said editing process, and another page having the set value of said item of which is different from that of said specified page before being subjected to said editing process.

* * * * *